United States Patent [19]

Blaise

[11] 3,891,651
[45] June 24, 1975

[54] COMPOUNDS DERIVED FROM TETRAHYDRO-ISOQUINOLINE AND GAMMA-BENZOPYRONE

[75] Inventor: Rolland Robert Blaise, Paris, France

[73] Assignee: Societe Anonyme pour l'Industrie Chimique, Mulhouse-Dornach, France

[22] Filed: Oct. 24, 1972

[21] Appl. No.: 299,895

[30] Foreign Application Priority Data
Oct. 21, 1971 France .............................. 71.37850
July 13, 1972 France .............................. 72.25542

[52] U.S. Cl. ........ 260/287 R; 260/247.2; 260/247.5; 260/289; 260/345.2; 424/258
[51] Int. Cl. .......................................... C07d 33/48
[58] Field of Search ..... 260/288 R, 287 R, 247.2 R, 260/247.5 R

[56] References Cited
UNITED STATES PATENTS

| | | | |
|---|---|---|---|
| 3,514,459 | 5/1970 | Retter et al. | 260/287 R |
| 3,629,290 | 12/1971 | Cairns et al. | 260/287 R |
| 3,639,476 | 2/1972 | Eberle et al. | 260/288 R |
| 3,652,557 | 3/1972 | Beyerle et al. | 260/247.2 B |

*Primary Examiner*—Donald G. Daus
*Assistant Examiner*—Mary C. Vaughn
*Attorney, Agent, or Firm*—Amster & Rothstein

[57] ABSTRACT

Compounds derived from 1-(3,4-dimethoxy benzyl) 6,7-dimethoxy 1,2,3,4-tetrahydro isoquinoline and 2-phenyl gamma-benzopyrone, of formula

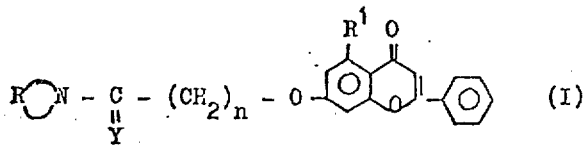

wherein 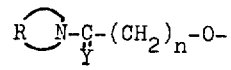 is

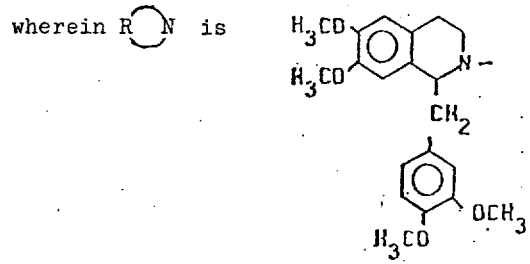

$n$ is an integer from 1 to 5 inclusive; Y is an oxygen atom or $H_2$, and $R^1$ is a hydrogen atom or the OH group, or still, if Y is an oxygen atom, the group

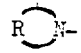

wherein

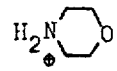

and $n$ are as defined above, or still, if Y is an oxygen atom and $n = 1$, the group $-O-(R')-COO^-B^+$ wherein

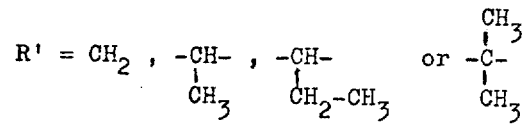

and $B^+ = Na^+, K^+, H_3N^+ -CH_2-CH_2OH, H_2N^+ (CH_2-CH_2OH)_2, HN^+ (CH_2-CH_2OH)_3$ or $H_2N^+\underset{\oplus}{\bigcirc}O$ which are useful as active ingredients in drugs having a spasmolytic action and capable of protecting blood vessels.

2 Claims, No Drawings

COMPOUNDS DERIVED FROM TETRAHYDRO-ISOQUINOLINE AND GAMMA-BENZOPYRONE

FIELD OF THE INVENTION

The present invention relates to novel compounds derived from 1-(3,4-dimethoxy benzyl) 6,7-dimethoxy 1,2,3,4-tetrahydro isoquinoline (to be hereinafter designated by the letter "A" for short and represented by Formula II) and from 2-phenyl gamma-benzopyrone (designated hereinafter by the letter "B" for short), which compounds are useful as novel drugs.

SUMMARY OF THE INVENTION

All these novel compounds are powerful spasmolytic drugs.

They are of the general formula:

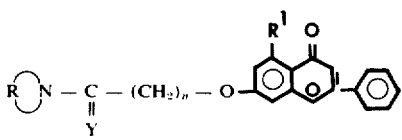

wherein

designates

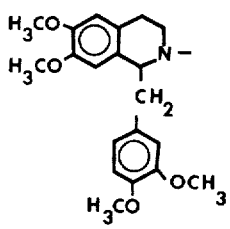

$n$ is an integer from 1 to 5; Y is an oxygen atom or $H_2$; and $R^1$ is a hydrogen atom or the OH group, or alternatively, when Y is an oxygen atom, the group

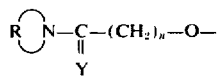

wherein

and $n$ are as defined hereinabove, or still, when Y is an oxygen atom and $n = 1$, the group $-O-(R'-)-COO^{\ominus}B^{\oplus}$, wherein

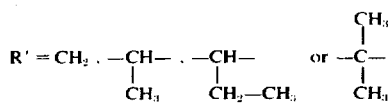

and
$B^+ = Na^+$, $K^+$, $H_3N^{\oplus}-CH_2-CH_2OH$, $H_2N^{\oplus}(CH_2-CH_2OH)_2$, $HN^{\oplus}(CH_2-CH_2OH)_3$ or

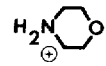

Another object of this invention is to provide methods of preparing said compounds.

The synthesis of all these products takes place in two stages differing according to the nature of the residue Y.

In the following reaction equations the initial compound A as defined hereinabove is represented by the symbol

1st case: Y = O (oxygen)

The products thus obtained are amides of A. They can be designated as follows: N-(2-phenyl gamma-benzopyronyl-oxy-acyl)-A.

The first stage of this synthesis is illustrated by the following reaction equation:

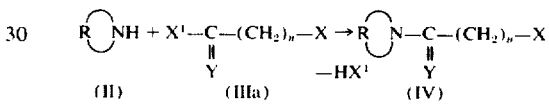

with Y = O; $n = 1, 2, 3, 4$ or $5$; $X^1$ and X = halogens.

In practice, A (II) is condensed by cooling to about 0°C with a halogenated aliphatic acid halide (IIIa) in a suitable solvent, such as toluene, and in the presence of a basic agent permitting the fixation of the released hydrogen halide $HX^1$, such as for instance an excess of A. Thus, a halogeno-alkylamide of A (IV) is obtained.

For the second stage of this synthesis, the reaction equation is as follows:

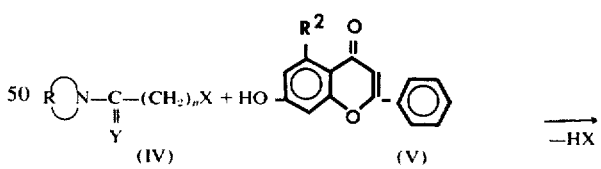

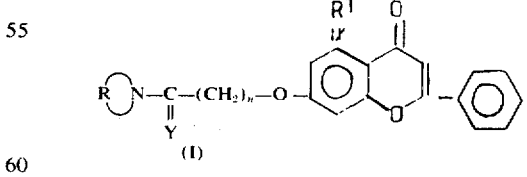

with Y = O; $n = 1, 2, 3, 4$ or $5$; $R^2 = H = R^1$; or $R^2 =$ OH and $R^1$ = OH or

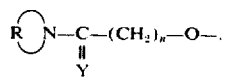

The halogeno-alkylamide (IV) prepared as disclosed hereinabove is condensed in the hot state, with 7-hydroxy B or 5,7-dihydroxy B (V) in a suitable solvent, such as dimethylformamide or acetone, for instance, and in the presence of a basic agent for fixing the released hydrogen halide HX such as sodium or potassium carbonate or bicarbonate. In the case of 5,7-dihydroxy B the reaction may take place with one hydroxy group or both groups, according to the selected operating conditions, i.e., essentially according to the relative proportions of reagents IV and V.

From the compound I in which $Y = O$, $n = 1$ and $R^1 = OH$, i.e., the N-(5-hydroxy 2-phenyl γ-benzopyronyl-(7) oxyacetyl)-A obtained through the above-described method and illustrated by formula VII hereinafter, the salts of mineral or organic bases having the general formula I wherein $Y = O$, $n = 1$ and $R^1$ is $-O-(R')-COO^\ominus \, B^\oplus$, wherein $R'$ and $B^\oplus$ are as defined hereinabove, are prepared in four stages.

The reaction diagram is as follows:

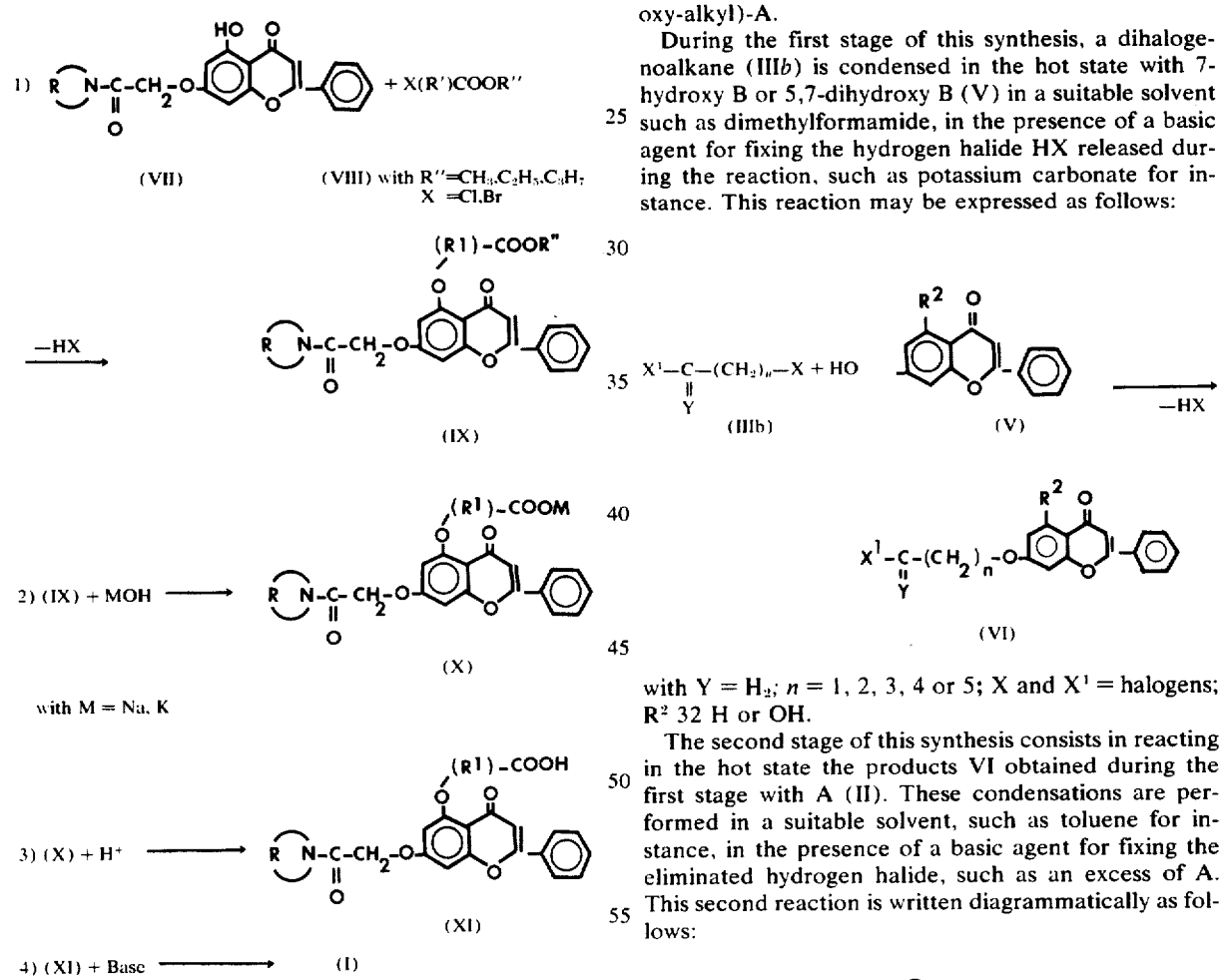

with M = Na, K

Firstly, an α-halogenated ester (VIII) is condensed with N-(5-hydroxy 2-phenyl γ-benzopyronyl-(7) oxyacetyl)-A (VII) in the hot state in a suitable solvent (such as dimethylformamide, methylethylketone, dimethylsulfoxide, etc.) in the presence of an alkaline agent (such as potassium carbonate, sodium carbonate or the like).

The ester IX thus obtained is hydrolyzed in the cold state by means of a mineral basic agent such as sodium hydroxide or potassium hydroxide in a suitable solvent such as a water-and-alcohol mixture.

Under these conditions, it is possible to crystallize the pure salt X by restoring the pH value to 7.

The acidification in the cold, for example by using hydrochloric acid, of a salt X solution in a 1 : 1 (by volume) water and alcohol mixture or of a suspension of salt X in a solvent such as methylene chloride, leads to acid XI. In this last instance, the acid XI crystallizes in the medium.

The acid XI may also be obtained directly, without the preliminary step of obtaining a salt X, by acidifying the solution after hydrolyzing the ester IX.

By simple neutralization with the suitable base of a solution or a suspension of acid XI in solvents such as dimethyl-formamide (solution) or methylene chloride (suspension) the soluble salts I are easily obtained. 2nd case: $Y = H_2$ The products obtained are derivatives of N-alkyl-A and may be called: N-(2-phenyl gamma-benzopyronl oxy-alkyl)-A.

During the first stage of this synthesis, a dihalogenoalkane (IIIb) is condensed in the hot state with 7-hydroxy B or 5,7-dihydroxy B (V) in a suitable solvent such as dimethylformamide, in the presence of a basic agent for fixing the hydrogen halide HX released during the reaction, such as potassium carbonate for instance. This reaction may be expressed as follows:

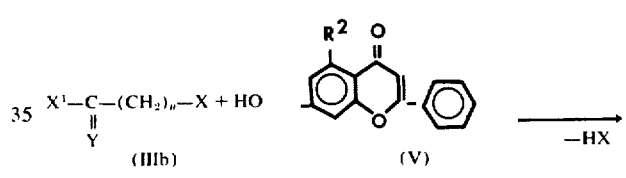

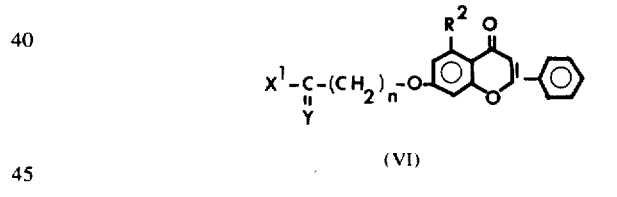

with $Y = H_2$; $n = 1, 2, 3, 4$ or $5$; X and $X^1$ = halogens; $R^2$ 32 H or OH.

The second stage of this synthesis consists in reacting in the hot state the products VI obtained during the first stage with A (II). These condensations are performed in a suitable solvent, such as toluene for instance, in the presence of a basic agent for fixing the eliminated hydrogen halide, such as an excess of A. This second reaction is written diagrammatically as follows:

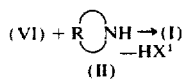

with $Y = H_2$; $n = 1, 2, 3, 4$ or $5$; $X^1$ = halogen; $R^1 = R^2$ = H or OH.

In formulas (IIIa) and (IIIb) hereinabove the halogens X and $X^1$ consist preferably of chlorine or bromine atoms.

In the two syntheses described hereinabove the raw materials used are on the one hand A (II) and on the other hand 7-hydroxy B or 5,7-dihydroxy B (V).

The first synthesis (case of Y = O) is characterized in that A is caused to react with a halogenated aliphatic acid halide (IIIa) by cooling to about 0°C in a solvent in the presence of a basic agent for fixing the released hydrogen halide for producing a halogeno-alkylamide of A (IV), and that the compound IV thus obtained is reacted in the hot state with 7-hydroxy B or 5,7-dihydroxy B (V) in a solvent and in the presence of a basic agent for fixing the released hydrogen halide, for obtaining the desired compounds of formula I wherein Y = O, $n$ is an integer from 1 to 5 and $R^1$ is H or OH, or

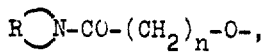

and that, for obtaining the compounds of formula I wherein Y = O, $n$ = 1 and $R^1$ is the group —O—(R-')—COO$^\ominus$B$^\oplus$, the product obtained with formula I wherein $R^1$ = OH and $n$ = 1, that is, N-(5-hydroxy 2-phenyl γ-benzopyronyl-(7) oxyacetyl)-A (VII) is condensed in the hot state in a solvent and in the presence of an alkaline agent, with an α-halogenated ester (VIII), for obtaining an ester according to formula IX, this ester being subsequently hydrolyzed in the cold state by using a mineral base in a solvent, the pH being afterwards reduced to 7 for causing the resulting salt (X) to crystallize, whereafter a solution or suspension of said salt (X) in a solvent is acidified in the cold state by using a strong acid, for producing the corresponding acid (XI) and finally a solution or suspension of this acid XI in a solvent is neutralized by using the suitable mineral or organic base.

When the raw material V is 5,7-dihydroxy B, a product according to formula I is obtained wherein $R^1$ is a hydroxyl group, when the molar proportions of the intermediate product IV and the raw material V reacted together are 1 : 1. When these proportions are 2:1 the product of formula I is obtained wherein $R^1$ is the group

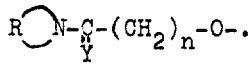

The second synthesis (case of Y = H$_2$) is characterized in that a dihalogeno-alkane (IIIb) is reacted in the hot state with 7-hydroxy B or 5,7-dihydroxy B (V) in a solvent and in the presence of a basic agent for fixing the released hydrogen halide for yielding a compound VI, and that this compound VI is caused to react in the hot state with A (II) in a solvent and in the presence of a basic agent for fixing the released hydrogen halide, for yielding the desired product according to formula I wherein Y = H$_2$ and $R^1$ is H or OH.

In the two syntheses, one may use as basic agent for fixing the released hydrogen halide, for instance, sodium or potassium carbonate or bicarbonate, or alternatively an excess of A in the reactions in which A (II) is used.

This invention is also concerned with the intermediate products according to formulas IV and VI, which are novel compounds, as well as with the methods of preparing same which are the first stage of the first synthesis and the first stage of the second synthesis, respectively.

The following examples illustrate the methods of preparing the intermediate products (Examples 1, 5, 6, 9, 11, 13, 14) and the end products I (all the other examples).

In these examples, the percentages are by weight and all the melting points (m.p.) mentioned have been determined by using a Kofler block.

DESCRIPTION OF THE PREFERRED EMBODIMENTS

Example 1 Compound according to formula IV

N-(chloroacetyl)-A (Empirical formula: $C_{22}H_{26}Cl\ NO_5$)

34.3 g of A (0.1 M) dissolved in 200 ml of toluene are cooled to 0°C.

6.7 g of chloroacetyl chloride (excess=20%) are added slowly while stirring strongly. After a few hours at 0°C the acid chloride excess is hydrolysed by using 100 ml of water, then the toluene solution is decanted. After washing with water and drying this solution, the toluene is evaporated and thus 21.7 g of beige product are obtained.

After recrystallization in alcohol, 20.5 g of white crystals (m.p.=129°-130°C), soluble in chloroform, dimethylformamide, acetic acid and insoluble in ether and water, are obtained.

Remark: The hydrochloride of A is recovered in the aqueous solution and in the wash water of toluene.

Example 2: Compound according to formula I.

N-(2-phenyl gamma-benzopyronyl-(7) oxyacetyl)-A (Empirical formula = $C_{37}H_{35}NO_8$)

General formula I with Y = O, $n$ = 1 and $R^1$ = H.

6.7 g of 7-hydroxy B, 13 g of N-(chloroacetyl)-A (obtained in Example 1), 7.7 g of potassium carbonate and 100 ml of dimethylformamide are heated while stirring during 8 hours at 70°C, then the temperature is raised to 100°C to complete the reaction.

This mixture is filtered in the hot state to separate the insoluble mineral salts, then concentrated, diluted with a small amount of water to crystallize the product, which is filtered and washed with ethyl alcohol.

Thus, 16.5 g of a white product having instantaneous m.p.=163°-164°C are obtained.

The product was checked by thin layer chromatography on silica gel: the purity is higher than 99%.

The structure already deducted from the synthesis was confirmed by a nuclear magnetic resonance analysis.

Example 3: compound of formula I

N-(5-hydroxy 2-phenyl gamma-benzopyronyl-(7) oxyacetyl)-A (Empirical formula = $C_{37}H_{35}NO_9$)

General formula I with Y = O, $n$ = 1 and $R^1$ = OH.

7.1 g of 5,7-dihydroxy B, 13.0 g of N-(chloroacetyl)-A (obtained in example 1), 7.7 g of potassium carbonate and 100 ml of acetone are heated under reflux conditions during 24 hours while stirring.

The mixture is cooled, filtered and the precipitate is washed with water. The raw product thus obtained is recrystallized in dimethylformamide and dried.

Finally, 12.8 g of a slightly yellowish product, m.p.=175°-176°C soluble in dimethylformamide and chloroform, insoluble in water, ethyl alcohol and benzene, are obtained.

To improve the yield, some product may further be recovered from the acetonic filtrate.

The purity of the end product was checked by thin layer chromatography on silica gel.

The chemical structure was confirmed by nuclear magnetic resonance.

Example 4: Formula I compound N,N'-[2-phenyl gammabenzopyronyl-(5,7) di(oxyacetyl)]bis-A (Empirical formula = $C_{39}H_{60}N_2O_{14}$)
General formula I with Y = O, $n$=1 and

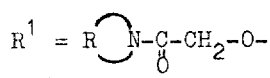

3.5. g of 5,7-dihydroxy B, 13.0 g of N-(chloroacetyl)-A (obtained in Example 1), 7.6 g of potassium carbonate and 100 ml of dimethylformamide are heated during 20 hours at 70°C under firm stirring conditions.

The mixture is cooled and filtered. The filtrate is concentrated in vacuo until a vitrified crude product is obtained. The dry residue is dissolved in benzene and the solution is percolated over an alumina column. The pure product is precipitated by adding isopropyl ether thereto.

By filtration, 9 g of nearly white product (m.p.= about 130°C), soluble in chloroform and dimethylformamide in the cold state, or in ethyl alcohol, ethyl acetate and toluene in the hot state, are obtained.

The purity was checked by thin layer chromatography on silica gel and the chemical structure was determined by nuclear magnetic resonance.

Example 5: Formula VI compound:

7-β-bromoethoxy B (Empirical formula = $C_{17}H_{13}BrO_3$)

47.6 g of 7-hydroxy B, 149.6 g of 1,2-dibromo ethane, 54.8 g of potassium carbonate, and 160 ml of dimethylformamide are heated while stirring during 90 mn at 85°C to complete decolorization. After cooling and filtering, the precipitate is washed with dimethylformamide then with water. Thus, a by-product, namely 11.5 g of 1,2-[bis 2-phenyl gamma-benzopyronyl-(7)] ethane (m.p. = 256°C), is obtained.

The filtrate is concentrated to dryness. The residue is recrystallized in butanol and thus 41.5 g of 7-β-bromoethoxy B, a yellowish beige powder, (m.p. = 139°–140°C), soluble in chloroform, acetic acid, dimethylformamide and insoluble in ether and water, are obtained.

The purity was whecked by thin layer chromatography on silica gel.

Example 6: Formula VI compound

7-β-bromoethoxy 5-hydroxy B (Empirical formula = $C_{17}H_{13}BrO_4$)

50.8 g of 5,7-dihydroxy B, 75 g of dibromomethane, 55.5 g of potassium carbonate and 300 ml of dimethylformamide are heated during 2 hours to 80°C, and the mixture is then cooled, filtered and the precipitate is washed firstly with dimethylformamide, then with water. Thus, 40 g of 1,2-bis[5-hydroxy 2-phenyl gammabenzopyronyl-(7)] ethane (m.p. = 280°C) are separated.

The initial filtrate (dimethylformamide solution) is diluted with the same volume of water. The crystallized product is filtered, washed with a mixture of dimethylformamide and water, then with water alone, and finally dried. Thus, 19 g of an impure product (m.p. = about 150°C) are obtained. After recrystallization in 80% acetic acid a residue consisting of 15.5 g of pure product (m.p. = 158°C), soluble in chloroform, dimethylformamide and insoluble in benzene, ether and water, is obtained.

The purity was checked by thin layer chromatography on silica gel.

Example 7: Formula I compound

N-[(2-phenyl gamma-benzopyronyl-(7) β-oxyethyl)]-A (Empirical formula = $C_{37}H_{37}NO_7$)
General formula I with Y = $H_2$, $n$ = 1 and $R^1$ = H.

6.7 g of 7-β-bromoethoxy B and 15 g of A are heated under reflux conditions during 24 hours in 80 ml of toluene.

The hydrobromide of A (which may be re-used) is filtered off after cooling. The filtrate is evaporated under partial vacuum and recrystallized in 60 ml of butanol.

Thus, 7.5 g of a beige powder melting at 158°C, soluble in chloroform and acetic acid, and insoluble in ether, are obtained.

The purity was checked by thin layer chromatography on silica gel and the chemical structure was confirmed by nuclear magnetic resonance.

Example 8: Formula I compound

N-(5-hydroxy 2-phenyl gamma-benzopyronyl-(7) β-oxyethyl)-A (Empirical formula = $C_{37}H_{37}NO_8$).
General formula I with Y = $H_2$, $n$ = 1, $R^1$ = OH.

7.1. g of 7-β-bromoethoxy 5-hydroxy B and 15 g of A are heated under reflux conditions during 24 hours in 160 ml of acetone.

The hydrobromide of A (about 7 g) is filtered in the hot state and the acetonic solution is evaporated. The dry residue is recrystallized in 40 ml of dimethylformamide.

Thus 8 g of a pale yellow product melting at 110°C are obtained.

The purity was checked by thin layer chromatography on silica gel and the chemical structure by nuclear magnetic resonance.

Example 9:

N-(5-ethoxy-carbonylmethoxy 2-phenyl γ-benzopyronyl-(7) oxyacetyl)-A

Formula IX with R' = $CH_2$, R'' = $C_2H_5$ (Empirical formula: $C_{41}H_{41}NO_{11}$) M.W. = 723

38.3 g of N-(5-hydroxy 2-phenyl γ-benzopyronyl-(7) oxyacetyl)-A, 8.8 g of ethyl hydrochloride, 16.6 g of anhydrous potassium carbonate and 360 g of dimethylformamide are heated while stirring during 12 hours at 70°C.

The mixture is filtered in the hot state to separate the insoluble mineral salts.

The dimethylformamide is expelled under reduced pressure.

The oily mass thus obtained may be engaged directly for preparing the salt "X" or acid "XI."

The pure ester is obtained with a 92% yield by dissolving the crude product in 400 ml of methanol and allowing same to crystallize.
M.P. = 140°–145°C.

Elementary analysis:
$C_{41}H_{41}NO_{11}$ calculated: %C 68.04 %H 5.70 %N 1.93
found: 67.72 5.85 1.68

Example 10

Sodium salt of N-(5-carboxymethoxy 2-phenyl γ-benzopyronyl-(7) oxyacetyl)-A acid Formula X with R' = $CH_2$, M= Na (Empirical formula: $C_{39}H_{36}NaNO_{11}$) M.W. = 717

The preceding crude ester is dissolved in 400 ml of boiling ethanol. After cooling to 20°C, 4 g of NaOH in 50 ml of ethanol are added. The mix is stirred during half an hour, then 300 ml of water are added. The resulting solution is neutralized to pH 7. The product is allowed to crystallize during 24 hours, filtered, washed with an ethanol and water mixture and finally dried in an oven at 80°C.

Thus, 40.2 g of white sodium salt are obtained.

Example 11

N-(5-carboxymethoxy 2-phenyl γ-benzopyronyl-(7) oxyacetyl)-A acid

Formula XI with R' = $CH_2$ (Empirical formula = $C_{39}H_{37}NO_{11}$) M.W. = 695

50 g of sodium salt are suspended in 300 ml of methylene chloride. 150 ml of 1N hydrochloric acid are added while stirring firmly. The dissolution is complete. The organic phase is decanted and allowed to rest overnight. The acid XI (R'=$CH_2$) is crystallized.

After filtration, washing three times with 25 ml of methanol and drying at 70°C, 37.5 g of white product are obtained. M.P. = 250°C.

By concentrating the methylene chloride solution, a complementary amount of product having a suitable degree of purity may still be collected.

The purity of the acid is controlled by chromatography on thin layers of silica gel (Kieselgel F 254 Merck) by using as elution agent a mixture (15–85 by volumes) of acetic acid and chlorobenzene.

The product may be recristallized in dimethylformamide.

Elementary analysis:
$C_{39}H_{37}NO_{11}$ Calculated: %C 67.33 %H 5.35 %N 2.01
Found: 67.25 5.12 1.80

Example 12

Preparation of salts of N-(5-carboxymethoxy 2-phenyl γ-benzopyronyl-(7)oxyacetyl)-A acid Example: diethanolamine salt (hereinafter named MD 22)

Formula I with R' = $CH_2$, $B^\ominus = H_2N^\oplus(CH_2-CH_2-OH)_2$ (Empirical formula: $C_{43}H_{48}N_2O_{13}$) M.W. = 800

120 g of acid XI (R' = $CH_2$) are added to a mixture of 18.5 g of 98% diethanolamine and 600 ml of methylene chloride, while stirring firmly.

After this addition is complete the mix is stirred during a further half-hour, filtered over an adjuvant and the methylene chloride is evaporated.

The diethanolamine salt is obtained quantitatively.

The structure is confirmed by spectrometry of nuclear magnetic resonance.

Elementary analysis:
$C_{43}H_{48}N_2O_{13}$ Calculated: %C 64.49 %H 6.03 %N 3.49
Found: 64.21 6.12 3.58

The salts may also be obtained by adding to a solution of the acid XI (R'=$CH_2$) in 10 parts of dimethylformamide the stoichiometric quantity of the corresponding base and by evaporating the dimethylformamide under reduced pressure.

The following salts of acid XI (R'=$CH_2$) have thus been prepared:

Sodium salt
$C_{39}H_{36}NaNO_{11}$ Calculated: %C 65.27 %H 5.05 %N 1.95
Found: 64.88 5.12 1.69

Potassium salt
$C_{39}C_{36}KNO_{11}$ Calculated: %C 63.84 %H 4.91 %N 1.90
Found: 63.52 4.63 2.01

Ethanolamine salt
$C_{41}H_{41}N_2O_{12}$ Calculated: %C 65.07 %H 5.85 %N 3.70
Found: 64.68 5.78 3.52

Triethanolamine salt
$C_{45}H_{52}N_2O_{14}$ Calculated: %C 61.08 %H 5.91 %N 3.16
Found: 60.80 5.69 3.24

Morpholine salt
$C_{43}H_{46}N_2O_{12}$ Calculated: %C 65.97 %H 5.91 %N 3.57
Found: 65.84 5.49 3.65

The sodium and potassium salts are moderately soluble in water. The amine salts are soluble.

Example 13

N-(5-α-ethoxycarbonylethoxy 2-phenyl γ-benzopyronyl-(7) oxyacetyl)-A

Formula IX with

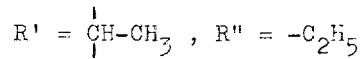

R'' = —$C_2H_5$

The procedure is the same as that described in Example 9, except that ethyl α-bromopropionate is substituted for the ethyl chlowacetate in equimolecular amounts.

After a first purification with methanol, the ester may be recrystallized in acetonitrile or in a mixture of dimethylformamide and alcohol.
M.P. =173°C.

The purity is checked by chromatography on thin layers of silica gel (Kieselgel F 254 Merck) by using an acetic acid-dioxanetoluene mixture (1:6:10 by volumes) as elution agent.

Elementary analysis:
$C_{42}H_{41}NO_{11}$ Calculated: %C 68.38 %H 5.86 %N 1.89
Found: 68.12 5.52 1.63

Example 14

Salts of N-(5-α-carboxyethoxy 2-phenyl γ-benzopyronyl-(7) oxyacetyl)-A acid.

Formula XI with R' = >CH—$CH_3$

Firstly 80 ml of methanol and then 8 ml of 10% sodium hydroxide are added in succession to 10.3 g of the preceding ester dissolved in 20 ml of dimethylformamide.

The solution becomes yellow.

This solution is stirred during 3 hours, neutralized to pH 7 and evaporated to dryness under reduced pressure. The residue is dissolved in a moderate quantity of water at 40°C and acidified with HCl diluted with water in the ratio 1 : 1 by volume. The acid is thus precipitated.

After filtration, washing with water and drying, 9 g of acid are obtained.

The recrystallization takes place in a dimethylformamide and alcohol mixture.

M.P. = 210°–215°C.

The purity is checked by chromatography on thin layers of silica gel (Kielselgel F 254 Merck) by using a chloroformtoluene-methanol-acetic acid mixture (20/70/40/6 by volumes) as elution agent.

Elementary analysis:
$C_{19}H_{19}NO_{11}$ Calculated: %C 67.79  %H 5.53  %N 1.97
Found: 67.28  5.31  1.62

Example 15

Salts of N-(5-α-carboxyethoxy 2-phenyl γ-benzopyronyl-(7) oxyacetyl)-A acid.

These salts are prepared according to the procedure described in Example 12.

The water solubility is similar to that of their above-described homologues.

Other objects of the invention include the use of the compounds according to formula I as spasmolytic drugs and the provision of therapeutic compositions containing these compounds as active substances, possibly in combination with other therapeutically active substances.

PHARMACOLOGICAL PROPERTIES AND TOXICITY

A. Formula I compounds wherein X = O or $H_2$; $n = 1$ to 5; $R^1$ = H, OH, or

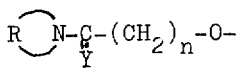

with Y = O.

These compounds I, and notably those according to formula I wherein $n = 1$, are powerful spasmolytic agents having a particularly pronounced activity in arteriole and coronary diseases due to their tonus-relaxing action, this action being more effective in patients having a very high blood-pressure.

Moreover, it may be noted that in contrast to most spasmolytic drugs acting on the walls of microvessels, they reinforce the strength of these microvessels.

Their pharmacological action was tested through conventional spasmolytic tests which proved that, in comparison with papaverine, given equal amounts of the benzyl-isoquinoline molar fraction, they are definitely more active than papaverine. In fact, on a separate duodenum of guinea-pig, contractured by barium chloride their activity is about 20% higher than that of papaverine hydrochloride. Tests made on the separate intestine of a guinea-pig, contractured by barium chloride or acetylcholine hydrochloride, or histamine hydrochloride, gave similar results.

The acute toxicity of these derivatives when administered by the oral route to rats is about 1560 mg/kg.

B. Formula I compounds wherein Y = O, $n = 1$ = 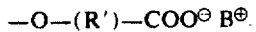

These compounds have the following effects: angiovascular spasmolytic, vasodilator, angioprotector, antiphlogistic, antiallergic effects.

The diethanolamine salt of Example 12 (named MD 22) has been studied more particularly.

1. Study of the spasmolytic action of MD 22 on the separated ileum of guinea-pig. Two experiments were made with two different contracturing agents, namely histamine dihydrochloride and potassium chloride.

a. Histamine dihydrochloride: the 180 μg/ml concentration of MD 22 put in contact with the separate organ (guinea-pig ileum) causes the histaminic contraction to be inhibited by 27.5% (which, in the present test, corresponds to 33 μg/ml of histamine dihydrochloride). (The figures referred to herein are those of one of 6 tests having all given substantially the same results). These experiments were made in an apparatus for separate organs according to the procedure described by J. L. Parrot ["Action of histamine on the isolated ileum of guinea-pig. Analysis of the action-dose diagram." Journal de Physiologie, Paris, 42, pp. 697–699, (1950)], according to Guggenheim and Löffler [Bioch. Z., 72, 303, (1916)].

b. Potassium chloride: the same concentration of MD 22 (180 μg/ml) in contact with the isolated organ (guinea-pig ileum) inhibited by 10% the contraction obtained with potassium chloride (which, in the present test, corresponds to 606 μg/ml). The same remarks as in paragraph (a) apply hereto.

It may be noted that the spasmolytic action ceases when the product is no more in contact with the organ; therefore the action is reversible.

2. Action of MD 22 on the bronchomotivity and histaminic bronchospasm in an anaesthetized guinea-pig. The technique avocated by Knozett and Rossler ["Versuchsanordnung zu Untersuchungen an der Bronchialmuskulatur." Arch. exp. Pathol. Pharmakol., 195, pp. 71–74, (1940)], modified by Guillerm et al. ["Action of cigarette smoke and some of its component elements on the ventilatory resistance of guinea-pigs." Arch. int. Pharmacodyn., 167, pp. 101–114, (1967)] is applied; it consists in injecting every 6 minutes a histamine dihydrochloride dose capable of producing in the experimented animal a bronchospasm of constant value representing a 100 percent activity.

By injecting MD 22 at the dosage of 17 mg per kg of body weight of the animal, by the intra-venous route, the bronchospasm is reduced and this reduction is as high as 80%, as early as at the 6th minute, and remains at this value during more than 20 minutes, its action being still effective after 60 minutes, when it is still of the order of 40%.

Calculating the activity areas proves that the activity of 183 μg of MD 22 corresponds to an inhibition of 12 205 μg of histamine dihydrochloride, this activity being distributed over a 60 minutes period.

By way of indication, it may be emphasized that the corresponding amount of papaverine hydrochloride, i.e., the stoichiometric amount of papaverine, produces an inhibition corresponding to 4 600 μg of histamine hydrochloride under the same conditions.

However, the papaverine hydrochloride inhibition is 100% after 6 minutes, but only 40% after 9 minutes and substantially zero after 27 minutes.

In other words, the action exerted by MD 22 is widely spread in time and very constant.

3. Toxicity of MD 22

The acute toxicity of MD 22 is very low: ALD 50 (acute lethal dose 50) = 4.16 g/kg.

The study of the chronical toxicity proved that the compound does not accumulate, provided that the frequency of administration thereof is at least 24 hours.

THERAPEUTIC APPLICATIONS

A. Compounds according to formula I, wherein Y = 0 or $H_2$; $n = 1$ to 5; $R^1 =$ H, OH, or $$R\!\!\bigcirc\!\!N\text{-}\underset{Y}{\overset{}{C}}\text{-}(CH_2)_n\text{-}O\text{-},$$

with Y = 0.

Treatment of cardio-angio-sclerotic and atheromateous diseases, the therapeutic indications being those of the vascular protectors and anti-spasmodic agents, for instance:

High blood-pressure.

Arteritis, pulmonar clot of blood, angor, coronaritis, myocardial infarct.

Raynaud's disease, angio-spastic retinitis.

Trophic diseases: gangrena, eschars.

It may be noted that the action of compounds I has a relatively long duration (activity-delay); therefore, repeated doses should be avoided as they might be conducive to accumulation phenomena in the blood.

Consequently, the average dose of active substance for human therapeutics is 0.20 g via the oral route every 12 hours in the case of a strong treatment; a "maintenance" treatment requires only 0.20 g per 24 hours.

The clinical experiments carried out proved that in high blood-pressure cases the hypotensive action was a gradual one.

The improvement in the irrigation of the various viscera, mainly of the brain, was at the same time very fast, continuous and considerable, while preserving the patients from the risk of vascular ruptures.

In old-aged patients, notably, particularly convincing results have been reported.

The pharmaceutic forms of the drugs are the conventional ones, notably those intended for administration by the oral route, such as tablets and capsules.

B. Compounds according to formula I, wherein Y = 0; $n = 1$; $R^1 = -O-(R')-COO^{\ominus}B^{\oplus}$.

Treatment of high blood-pressure, ischemia, oedemas, asthma.

The efficient dose for human beings is 50 mg to 400 mg of active substance daily in one or several doses.

Pharmaceutical study

The pharmaceutical compositions containing as active substance at least one of these compounds may assume anyone of the conventional forms suitable for administration by the oral route (tablets, granules, drinkable solutions and suspensions, etc.) or the parenteral route (injectable solutions, suppositories). These compositions contain, in addition to the active substance, the usual pharmaceutically acceptable carriers and excipients, and the active substance may if desired be associated therein with other therapeutically active substances, such as hypotensors, vitamins A, E, C diuretics, etc.

Clinical study

It has been carried out specially with MD 22.

This compound has been studied:

1. in high blood-pressure as vasodilator.
2. in spasms of cerebral arteries (ischemia) where the results were superior to those of papaverine as well by the action duration as by the constance of the produced effect.

Furthermore, this compound possesses an angioprotective action towards microvessels and an antiphlogistic activity in cases of oedemas.

3. This compound proved to be an excellent adjuvant in the treatment of asthma due to its spasmolytic effect, specially in cases of acute fits.

I claim:

1. A compound derived from 1-(3,4-dimethoxy benzyl) 6,7-dimethoxy 1,2,3,4-tetrahydro isoquinoline and 2-phenyl gammabenzopyrone, of formula $$R\!\!\bigcirc\!\!N - \underset{Y}{\overset{O}{\underset{\|}{C}}} - (CH_2)_n - O - \underset{}{\underset{}{\text{[chromone-phenyl]}}} \quad (I)$$

with $R^1$ and O on the chromone ring wherein $R\!\!\bigcirc\!\!N-$ is

[structure: 6,7-dimethoxy-1-(3,4-dimethoxybenzyl)-1,2,3,4-tetrahydroisoquinolinyl group with $H_3CO$, $H_3CO$ on isoquinoline and $CH_2$ linker to phenyl bearing $OCH_3$, $H_3CO$]

$n$ is 1, Y is an oxygen atom, and $R^1$ is the group $-O-(R')-COO^-B^+$ wherein $$R' = CH_2, \; -\underset{CH_3}{\overset{}{CH}}-, \; -\underset{CH_2\text{-}CH_3}{\overset{}{CH}}-, \; \text{or} \; -\underset{CH_3}{\overset{CH_3}{\underset{|}{\overset{|}{C}}}}- \quad \text{and}$$

$B^+$ = $Na^+$, $K^+$, $H_3N^\oplus$—$CH_2$—$CH_2OH$, $H_2N^\oplus(CH_2$—$CH_2OH)_2$, $HN^\oplus(CH_2$—$CH_2OH)_3$ or
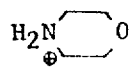
2. A compound according to claim 1, wherein R' is $CH_2$ and $B^+$ is $NH_2(CH_2CH_2OH)_2$.
* * * * *